J. L. BOYLE.
MAKING SAUSAGES.
APPLICATION FILED OCT. 28, 1909.
1,009,953.
Patented Nov. 28, 1911.
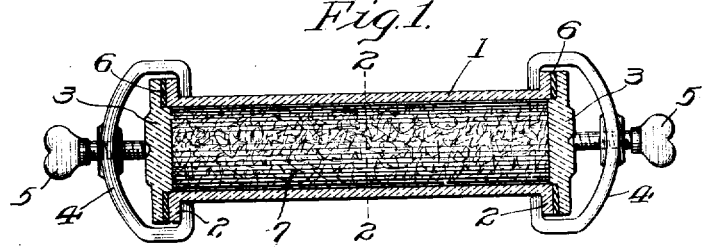
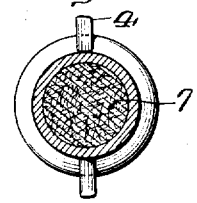
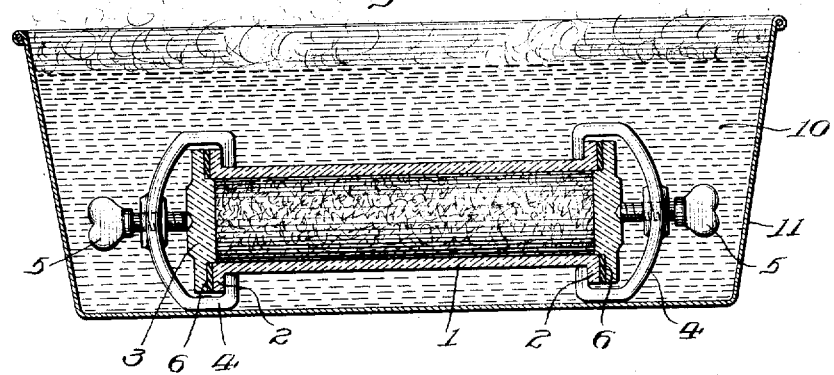
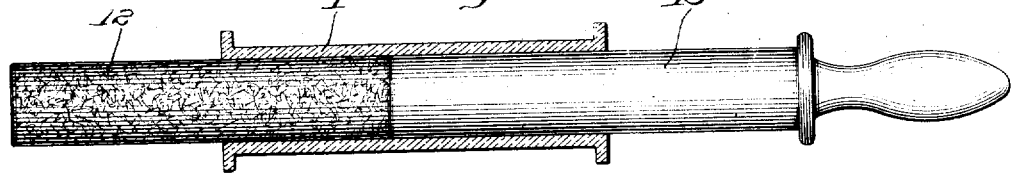
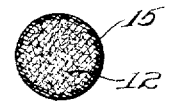
INVENTOR
James L. Boyle.
WITNESSES
BY
ATTORNEY

UNITED STATES PATENT OFFICE.

JAMES LEE BOYLE, OF OCEAN CITY, NEW JERSEY, ASSIGNOR OF ONE-HALF TO JAMES S. KNEISLER, OF PHILADELPHIA, PENNSYLVANIA.

MAKING SAUSAGES.

1,009,953.  Specification of Letters Patent.  Patented Nov. 28, 1911.

Application filed October 28, 1909. Serial No. 525,103.

*To all whom it may concern:*

Be it known that I, JAMES LEE BOYLE, a citizen of the United States, and a resident of Ocean City, New Jersey, have invented certain new and useful Improvements in Sausages and in the Process of Making Sausages, of which the following is a specification.

Heretofore in the manufacture of sausage, it has been customary to inclose the sausages in separate casings to hold the sausages in shape, but the casings which are generally used for this purpose impart a peculiar, unpleasant flavor to the sausages; and, moreover, these casings are frequently imported from countries where there is no Government meat inspection and therefore are liable to contain disease germs and be otherwise unwholesome, and on account of the shape of these casings, it is practically impossible to cleanse them thoroughly before they are applied to the sausage. These casings are also expensive and after having been applied to the sausages it is necessary to separate the sausages by tying the casings between the sausages, which adds considerably to the expense of manufacture.

This invention dispenses with the casings heretofore used in manufacturing sausages, and provides a sausage which is surrounded by a smooth film or coating, formed of the same material as the body of the sausage but of greater tensile strength, whereby the sausage is held in shape, and by thus dispensing with the casings the cost of the manufacture of sausages is reduced and their appearance and flavor are improved.

The main objects of this invention are: to provide a sausage having an external film or coating, formed of the same material as the body of the sausage but of greater tensile strength, whereby the sausage will be retained in a predetermined shape, so that the sausage may be handled and served in any manner heretofore customary with sausages which have been inclosed in separate casings; and whereby the sausage will be preserved from deterioration; to provide a sausage of improved flavor and appearance; to provide a sanitary sausage; and to provide a process for the manufacture of this improved sausage.

In the accompanying drawings, Figure 1 is a side view of one form of mold used in the application of the process, forming a part of this invention, the mold being filled with sausage meat; Fig. 2 a transverse section on line 2—2 of Fig. 1; Fig. 3 a vertical section showing the filled mold immersed in hot water; Fig. 4 a longitudinal section showing the sausage in process of being ejected from the mold; Fig. 5 a perspective view of an improved sausage forming a part of this invention; and Fig. 6 a transverse section on line 6—6 of Fig. 5.

In applying the process forming part of this invention, one form of apparatus which might be used comprises a cylindrical mold 1, made of glass, or porcelain, or other vitreous material, or of metal lined with porcelain, or made of any other suitable heat-conducting material which will not adhere to sausage meat when heated in the mold to prevent its ejection therefrom. This mold has an internal diameter and a length corresponding to the diameter and length of the sausage which it is desired to manufacture, and each end of the mold is open and is provided with an outwardly extending flange 2, integral therewith, and with a removable closure 3, formed of the same material as the body of the mold and held in place over the open end of the same by an adjustable clamp 4, carrying a thumb-screw 5, which engages against the closure 3, the ends of the clamp engaging the inner surface of the flange 2 of the body of the mold. A washer 6, of rubber or other yielding material is preferably inserted between each cover 3, and the body of the mold, to make a tight joint and to prevent breaking the mold. This mold is filled with any usual or suitable mixture 7 of sausage meats, for instance, such as is ordinarily used in filling casings and consisting of a combination of beef and pork, properly seasoned, to which cereals may be added as a binder. This sausage meat is preferably packed tightly in the mold and the closures 3, are then clamped over the open ends of the mold. The mold thus filled is then heated, preferably by being placed in water 10, contained in a suitable receptacle 11, and having a temperature of between 155 and 160 degrees Fahrenheit, in which it is permitted to remain for about five minutes. Instead of using hot water for this purpose, the mold might be heated in an oven maintained at the desired temperature. The mold is then removed from the water or other heating medium, and the sausage 12, which has now been formed within the mold is ejected from the mold by removing the closures from the end of the mold and forcing the sausage out of the mold with a suitable plunger 13, preferably having a diameter substantially equal to the internal diameter of the mold. The sausage is then smoked and is then ready for the market.

The sausage thus formed has an external film or coating 15, which is the result of the searing action of the heated mold upon the sausage meat or mixture packed therein that occurred while the mold was immersed in the hot water, and this coating is smooth and of greater tensile strength than the body of the sausage, and performs all the functions which have heretofore been performed by the separate casing which has been heretofore applied to a sausage, and in addition improves the appearance, flavor and lasting qualities of the sausage. This coating has a beautiful color and imparts to the sausage a peculiarly pleasing flavor, similar to that of beef broiled over coals, and there is an entire absence of the disagreeable flavor which has heretofore been imparted to sausage by the usual casing.

The apparatus described hereinbefore for manufacturing this improved sausage is not necessarily such as would be used commercially, but has been selected simply to illustrate the process forming part of this invention, as any suitable apparatus may be used in applying this process, and it is to be understood that many changes might be made both in the process and in the resulting product hereinbefore described, without departing from the spirit of this invention or the scope of the appended claims.

Having thus fully described my invention, I claim and desire to protect by Letters Patent of the United States:—

1. A sausage having an external film or coating formed of the same material as the body of the sausage but of greater tensile strength.

2. A sausage having an uncooked main or body portion inclosed by a seared film formed of the same material as said body portion and having greater tensile strength.

3. The process which consists in forming sausage meat into a predetermined shape in a mold, then searing the surface of said meat while in said mold to create a film of greater tensile strength than and around the body portion of said meat and then ejecting said meat from said mold.

4. The process which consists in forming sausage meat into a predetermined shape in a mold constructed of heat-conducting material, and then searing the surface of said meat by applying heat to said mold to create a coating around said meat to retain the molded shape.

5. The process which consists in forming meat into a predetermined shape in a mold constructed of heat-conducting material, then searing the surface of said meat by applying heat to said mold to form a thin film thereupon, said film being of comparatively greater tensile strength than the rest of said meat to maintain the molded shape, and then ejecting said meat from said mold.

6. The process of manufacturing sausage which consists in forming sausage meat into a predetermined form in a mold constructed of heat-conducting material, then searing the surface of said sausage meat to form a film therearound by applying heat to said mold, and then ejecting said sausage from said mold.

7. The process of manufacturing sausage which consists of forming sausage meat into a predetermined shape in a mold of heat-conducting material, then heating said mold in a temperature of about 155 to 160 degrees Fahrenheit for a short period to form a coating around the body portion of said meat, then ejecting said sausage meat from said mold.

8. The process of manufacturing sausage which consists of forming sausage meat into a predetermined shape in a mold of heat-conducting material, then heating said mold in a temperature of about 155 to 160 degrees Fahrenheit for about five minutes to form a film of greater tensile strength around the body portion of said meat, then ejecting said sausage meat from said mold.

9. The process of manufacturing sausage which consists of forming sausage meat into a predetermined shape in a mold, then forming a film of greater tensile strength around said sausage meat by heating the surface thereof through said mold, then ejecting said sausage meat from said mold, and then smoking the sausage thus formed.

10. The process of forming meat into a predetermined shape in a mold, and then applying heat to said meat while in said mold for a few minutes only to form a thin retaining film thereupon.

11. The process of forming meat into a predetermined shape in a mold, and then applying heat to said meat while in said mold for a few minutes only, at a temperature of about 150 to 160 degrees Fahrenheit to form a thin retaining film thereupon.

12. The process which consists in forming meat into a predetermined shape in a mold of heat-conducting material, and then forming a retaining film or coating on the surface of said meat in said mold by applying heat to said mold to insure the permanent molded shape of said meat.

13. The process of manufacturing sausage, which consists of forming sausage meat into a predetermined shape in a mold, then applying heat externally to said sausage through said mold for about five minutes, at a temperature of less than the boiling temperature of water to form a protecting film on the outside thereof, then ejecting said sausage meat from said mold.

14. The process of manufacturing sausage, which consists in forming sausage into a predetermined shape in a mold, then forming a film or coating on the surface of said sausage while in said predetermined shape in said mold, by applying heat externally to said mold to form a protective coating on said sausage, and then removing said sausage in said predetermined shape.

15. The process of manufacturing sausage, which consists in forming sausage into a predetermined shape in a mold, and later ejecting said sausage from said mold in said predetermined shape after having heated said sausage to form an inclosing film to maintain it in the molded shape.

16. In the manufacture of sausage, the molding of meat under pressure in a vitreous from 150 to 160 degrees Fahrenheit thereto.

17. In the manufacture of sausage, the molding of meat under pressure in a vitreous mold, and then applying heat approximately from 150 to 160 degrees Fahrenheit thereto.

18. In the manufacture of sausage, the molding of meat under pressure in a vitreous mold, and then applying heat thereto for a few minutes only to create a film of meat of greater tensile strength around the body portion.

In witness whereof, I have hereunto set my hand this 26th day of October, 1909.

JAMES LEE BOYLE.

Witnesses:
ADDISON IRWIN GARDNER,
ALEXANDER PARK.

---

Correction in Letters Patent No. 1,009,953.

It is hereby certified that in Letters Patent No. 1,009,953, granted November 28, 1911, upon the application of James Lee Boyle, of Ocean City, New Jersey, for an improvement in "Making Sausages," an error appears in the printed specification requiring correction as follows: Page 3, line 26, strike out the words and numerals, "from 150 to 160 degrees Fahrenheit thereto" and insert the words *mold, and then applying heat thereto;* and that the said Letters Patent should be read with this correction therein that the same may conform to the record of the case in the Patent Office.

Signed and sealed this 26th day of December, A. D., 1911.

[SEAL.]

C. C. BILLINGS,
*Acting Commissioner of Patents.* a predetermined shape in a mold, then applying heat externally to said sausage through said mold for about five minutes, at a temperature of less than the boiling temperature of water to form a protecting film on the outside thereof, then ejecting said sausage meat from said mold.

14. The process of manufacturing sausage, which consists in forming sausage into a predetermined shape in a mold, then forming a film or coating on the surface of said sausage while in said predetermined shape in said mold, by applying heat externally to said mold to form a protective coating on said sausage, and then removing said sausage in said predetermined shape.

15. The process of manufacturing sausage, which consists in forming sausage into a predetermined shape in a mold, and later ejecting said sausage from said mold in said predetermined shape after having heated said sausage to form an inclosing film to maintain it in the molded shape.

16. In the manufacture of sausage, the molding of meat under pressure in a vitreous from 150 to 160 degrees Fahrenheit thereto.

17. In the manufacture of sausage, the molding of meat under pressure in a vitreous mold, and then applying heat approximately from 150 to 160 degrees Fahrenheit thereto.

18. In the manufacture of sausage, the molding of meat under pressure in a vitreous mold, and then applying heat thereto for a few minutes only to create a film of meat of greater tensile strength around the body portion.

In witness whereof, I have hereunto set my hand this 26th day of October, 1909.

JAMES LEE BOYLE.

Witnesses:
ADDISON IRWIN GARDNER,
ALEXANDER PARK.

---

Correction in Letters Patent No. 1,009,953.

It is hereby certified that in Letters Patent No. 1,009,953, granted November 28, 1911, upon the application of James Lee Boyle, of Ocean City, New Jersey, for an improvement in "Making Sausages," an error appears in the printed specification requiring correction as follows: Page 3, line 26, strike out the words and numerals, "from 150 to 160 degrees Fahrenheit thereto" and insert the words *mold, and then applying heat thereto;* and that the said Letters Patent should be read with this correction therein that the same may conform to the record of the case in the Patent Office.

Signed and sealed this 26th day of December, A. D., 1911.

[SEAL.]

C. C. BILLINGS,
*Acting Commissioner of Patents.*

It is hereby certified that in Letters Patent No. 1,009,953, granted November 28, 1911, upon the application of James Lee Boyle, of Ocean City, New Jersey, for an improvement in "Making Sausages," an error appears in the printed specification requiring correction as follows: Page 3, line 26, strike out the words and numerals, "from 150 to 160 degrees Fahrenheit thereto" and insert the words *mold, and then applying heat thereto;* and that the said Letters Patent should be read with this correction therein that the same may conform to the record of the case in the Patent Office.

Signed and sealed this 26th day of December, A. D., 1911.

[SEAL.]

C. C. BILLINGS,
*Acting Commissioner of Patents.*